United States Patent [19]

Wardill

[11] 4,221,426
[45] Sep. 9, 1980

[54] VEHICLE BODY STRUCTURES AND PANELS THEREFOR

[75] Inventor: Gordon A. Wardill, Cranfield, England

[73] Assignee: National Research Development Corporation, London, England

[21] Appl. No.: 885,032

[22] Filed: Mar. 9, 1978

[30] Foreign Application Priority Data

Mar. 11, 1977 [GB] United Kingdom ............... 10364/77
Oct. 11, 1977 [GB] United Kingdom ............... 42294/77

[51] Int. Cl.² .......................................... B62D 27/00
[52] U.S. Cl. ................................. 296/178; 105/397; 296/183
[58] Field of Search .............. 296/28 A, 28 AB, 28 R, 296/31 R, 31 P, 28 J, 28 K, 28 M, 178, 181, 183; 105/329, 397, 401; 428/310, 457

[56] References Cited

U.S. PATENT DOCUMENTS

| | | | |
|---|---|---|---|
| 2,425,948 | 8/1947 | Lucien | 296/28 K |
| 2,758,870 | 8/1956 | Nallinger | 296/28 A |
| 3,068,043 | 12/1962 | Komenda | 296/31 P |
| 3,100,458 | 8/1963 | Baker | 296/28 A |
| 3,131,649 | 5/1964 | Eggert | 105/401 |
| 3,673,675 | 7/1972 | Eggert | 296/28 M |
| 3,711,148 | 1/1973 | Hindin | 296/28 M |
| 3,794,374 | 2/1974 | Manning | 296/28 A |
| 3,881,765 | 5/1975 | Cerra | 296/28 A |
| 3,948,614 | 4/1976 | Michalon | 428/310 |
| 3,989,562 | 11/1976 | Hladik | 428/310 |

*Primary Examiner*—John J. Love
*Assistant Examiner*—John A. Carroll
*Attorney, Agent, or Firm*—Oblon, Fisher, Spivak, McClelland & Maier

[57] ABSTRACT

The invention includes vehicle body panels, and vehicles containing such panels. The panels contain reinforcement that enables them when assembled to contribute to the structural strength of the vehicle. The basic volume of each panel is formed from plastics by reaction-injection moulding so that the panels are light in weight and would be inadequate, in the absence of the reinforcement, to withstand the structural loads. In a typical vehicle construction panels are arranged to form arches spanning from one side of the vehicle to the other, a succession of such arches being assembled together down the length of the vehicle.

14 Claims, 9 Drawing Figures

VEHICLE BODY STRUCTURES AND PANELS THEREFOR

1. Field of the Invention

BACKGROUND OF THE INVENTION

This invention relates to the structures of vehicle bodies and of parts for them, and to panels for use in such structures. It relates in particular to the bodies of vehicles such as buses.

2. Description of the Prior Art

Buses are usually constructed by building an accurately-jigged frame, including a series of hoops joined by longitudinal stringers, on to a manufacturer's standard chassis. Facing panels are then attached to the frame. The frame is a large component, occupying nearly the same superficial volume as the finished bus itself, and must be very accurately made thus requiring expensive jigs and tooling. Expensive skilled labour is also required to make the frame and to fit the panels to it. Thus bus bodies made in this way are expensive. They also tend to lack rigidity unless the components of the frame are quite massive, thus adding to weight and expense.

A modification of the above construction system, known sometimes as "integral" or "semi-integral" construction, has been used for some buses. In this system chassis and frame are designed together, with the intention that each should only be used with the other. Weight for weight, the resulting body is usually more rigid than one constructed by the more customary system already described. The requirement for skilled labour to assemble the frame and fit the panels to it is also often reduced. However, the tooling cost is even higher, and because the chassis is no longer a standard item such methods of construction are usually only profitable when very long production runs can be assured.

The present invention arises from an appreciation of the advantages of making a vehicle body, ready to fit to a typical chassis, from panels of relatively few different shapes that can be mass-produced to high standards of accuracy, and from an appreciation that it is possible to make such panels so that they themselves, when assembled to make up the body, can provide it with at least a substantial part of the structural strength that it will require.

SUMMARY OF THE INVENTION

An object of the present invention includes the provision for a vehicle body structure including a rigid chassis member attached to a body shell having a plurality of interconnected reinforced moulded body panels, the panels being arranged in a lengthwise succession of arch-like structures down the length of the chassis, each arch spanning from one side of the vehicle to the other, and each panel being rigidly joined in circumferential fashion to the chassis (directly or indirectly) or to an adjacent panel in the arch, and in lengthwise fashion to a panel in the adjacent arch.

At least some of the panels may include customary vehicle features such as windows, doors or seats, and the body shell may be completed by further panels, for instance for the front and rear faces of the vehicle.

Further arch-like structural member- for instance, metal rings, may be included in the joints between adjacent arches, and further longitudinal structural support, for instance, metal rods or strips, may be included in the circumferential joints between corresponding pairs of panels in the arches along the length of the body.

The invention also includes a body panel for a vehicle, formed from plastics by reaction-injection-moulding, in which primary reinforcing members are moulded into the panel, and in which these reinforcing members both include attachment points whereby the panel may be joined to adjacent panels or to other parts of the vehicle, and give the panel sufficient strength to serve as part of the load-bearing structure of the vehicle.

The term "reaction-injection moulding" is now well-known to those skilled in the art, and broadly covers injection, moulding in which the compensation of the finished, moulded article is produced by chemical reaction of injected ingredient materials within the mould. The final article resulting from such reaction normally includes a foamed interior surrounded by a solid skin where the reacting ingredients have been formed and chilled by contact with the mould walls. Such a material results, for example, from the reaction of the polyisocyanate mix described hereinbelow. Reaction-injection moulding is thus essentially different from another known way of moulding products with foamed interiors, usually known as foam moulding, in which the final chemical composition is essentially similar to that of the principal ingredients but the foam action has been generated by a separate gas-producing ingredient and could have been commenced prior to injection. Polycarbonate foam is often moulded into shaped products in this way, for instance, using known injection moulding machines. When set, such products of course show a gradual transition from solid skin to true foam as one penetrates inwards from the surface. In contrast, the more conventional mouldable materials, whether formed by injection-moulding techniques or otherwise, are set to a homogeneous consistency with no differences between the interior and the surface layers.

The plastics material may be of the self-skinning type, for instance, polyurethane-based, and the panels may be of deeper section at least around the edges than elsewhere, the primary reinforcement being located in the regions of deeper section. Such reinforcement may include flexible members strong in tension, for instance metal wire, or strong rigid members, for instance metal strip of channel or angle-section.

The means to join the panel to adjacent panels or to other parts of the vehicle may include holes for rivets, or other devices, formed in the primary reinforcing members moulded into the edge of the panel.

The panel may also include secondary reinforcement, for instance metal mesh, included within it during moulding, and this secondary reinforcement may be of sheet-like form and be present over a substantial proportion of the panel area.

Such panels may be shaped so as to serve some purpose in the vehicle other than simply forming part of the body shell wall and bearing some of the structural loads of the vehicle, for instance the panels may be shaped so as to provide seats, or to serve as doors, or to contain orifices for windows.

Various other objects, featurs and attendant advantages of the present invention will be more fully appreciated as the same becomes better understood by the following detailed description when considered in connection with the accompanying drawings in which like reference characters designate like or corresponding parts throughout the several views, and wherein:

DETAILED DESCRIPTION OF THE PREFERRED EMBODIMENTS

Figure 1:
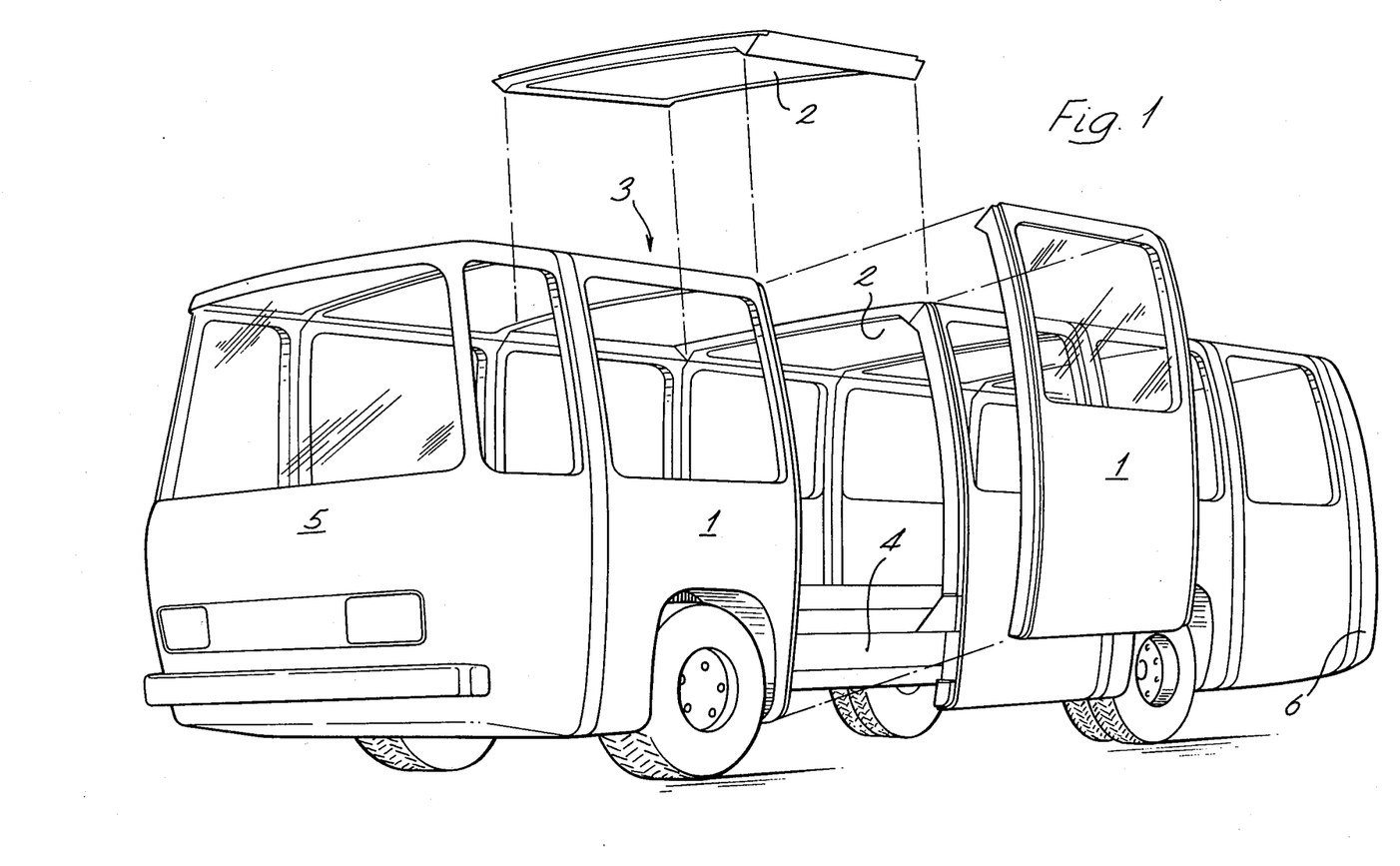
FIG. 1 is a perspective view of a bus, during assembly of a body structure according to this invention.

FIG. 1 demonstrates the simple modular construction of bus that is possible with this invention. Side panels 1 and roof panels 2 are assembled together in arch-like formations 3 spanning from opposite sides of the chassis 4. Each panel 1, 2 is joined not only to adjacent panels in the same arch, or to the chassis, but to the corresponding panels in adjacent arches. The vehicle body shell is completed by a front panel 5 and a rear panel 6.

Figure 2:
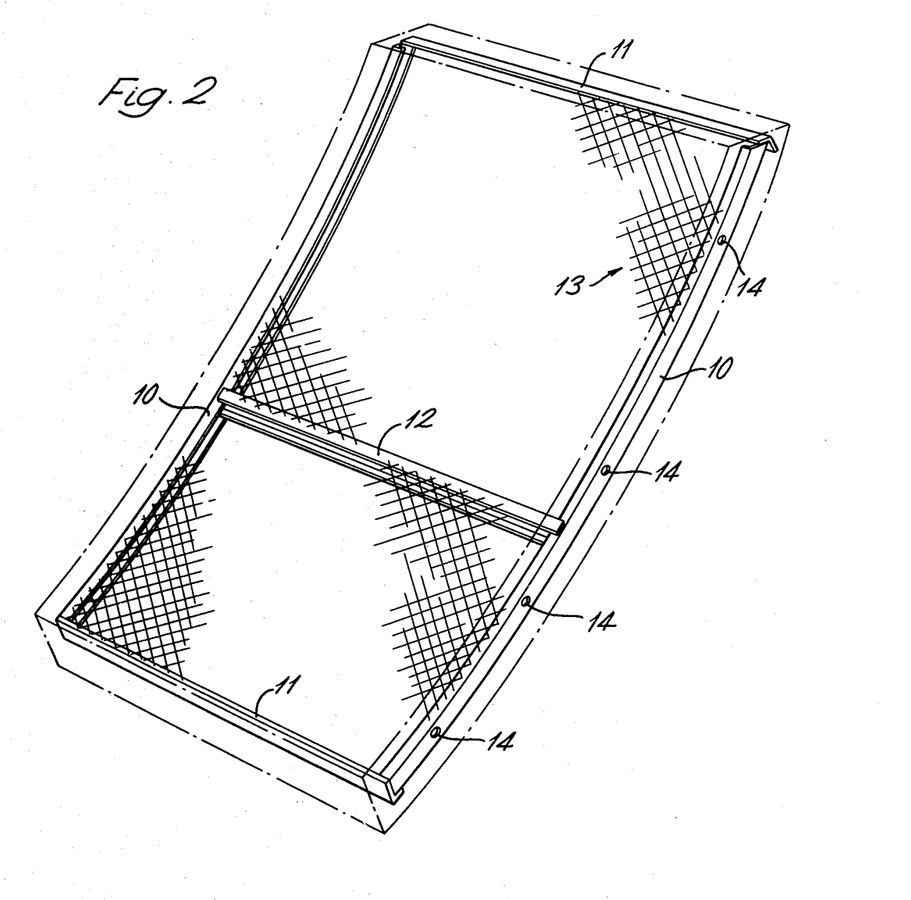
FIG. 2 is a perspective view of an assembled reinforcement, ready for moulding into a panel.

FIG. 2 shows the reinforcement for one panel according to this invention. This includes first a primary reinforcement, which ensures in the finished panel sufficient strength for that panel, when assembled with like panels, to play a substantial part in resisting the structural loads of the vehicle. Secondary reinforcement enhances the rigidity of the panels and their resistance to vibration, impact etc., without so substantially adding to their structural strength. The primary reinforcement shown in FIG. 2 includes two long side members 10, two short side members 11 and a cross member 12, all of the rigid metal angle and secured to each other by riveting, bolting, welding or the like. The secondary reinforcement includes metal mesh 13, covering substantially the whole area of the finished panel and spot-welded to the members 10, 11 and 12. Members 10 and 11 are formed with holes 14 to receive bolts by which the finished panels may be joined to adjacent panels or other parts of the vehicle.

Figure 3:
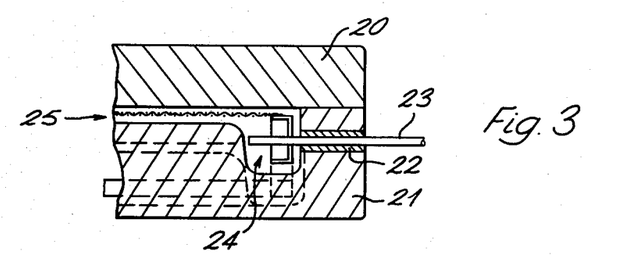
FIG. 3 is a diagrammatic section through part of a mould for forming panels.

FIG. 3 diagrammatically shows a mould in which a panel containing the reinforcement of FIG. 2 may be formed. The two parts of the split mould are shown at 20 and 21, and part 21 is formed with bushed apertures 22 to admit pins 23 which may engage with the holes 14 to hold the assembled reinforcement at the correct location within the mould cavity during moulding. FIG. 3 plainly shows that the edge region of the panel, formed within region 24 of the mould cavity and containing the primary reinforcement members 10 and 11, will be of comparatively deep section, tapering to a shallower section inboard of the edge. This shallower section will be formed by region 25 of the mould cavity and will contain the secondary mesh reinforcement 13. The mould will also form a thicker moulded section across the panel to contain the cross member 12. The invention applies particularly to panels, and vehicle bodies made up of them, in which the reinforcement is embedded in a self-skinning, reaction-injection-moulded mass of plastics, for instance of polyurethane base. In a typical case using a mould as just described with reference to FIG. 3, the mould is positioned such that the cavity lies approximately horizontal. Part 20 of the mould, which forms the outer surface of the panel, is then removed and the cavity surfaces are coated with a separating agent. The reinforcement is then lowered into the cavity in part 21. Pins 23 are then pushed into the cavity from the outside of the mould, these pins passing through bushes in apertures 22. The pins pass through pre-drilled holes 14 in the reinforcement, and tubular spacers may be placed between the reinforcement and the cavity walls. The reinforcement may thus be located at a predetermined position within the mould cavity. Part 20 of the mould is then lowered into contact with part 21 and the two parts are clamped together by means of bolts or hydraulic clamps. The mould is then oriented such as to minimize air entrapment in the cavity and a polyolisocyanate mix is pumped into the cavity via a suitably placed gate. Air vents are provided in part 20, a foaming reaction then takes place and after a suitable curing period the mould is returned to the horizontal position and part 20 is removed. The locating pins are then withdrawn and the composite moulding is extracted.

Figure 4:
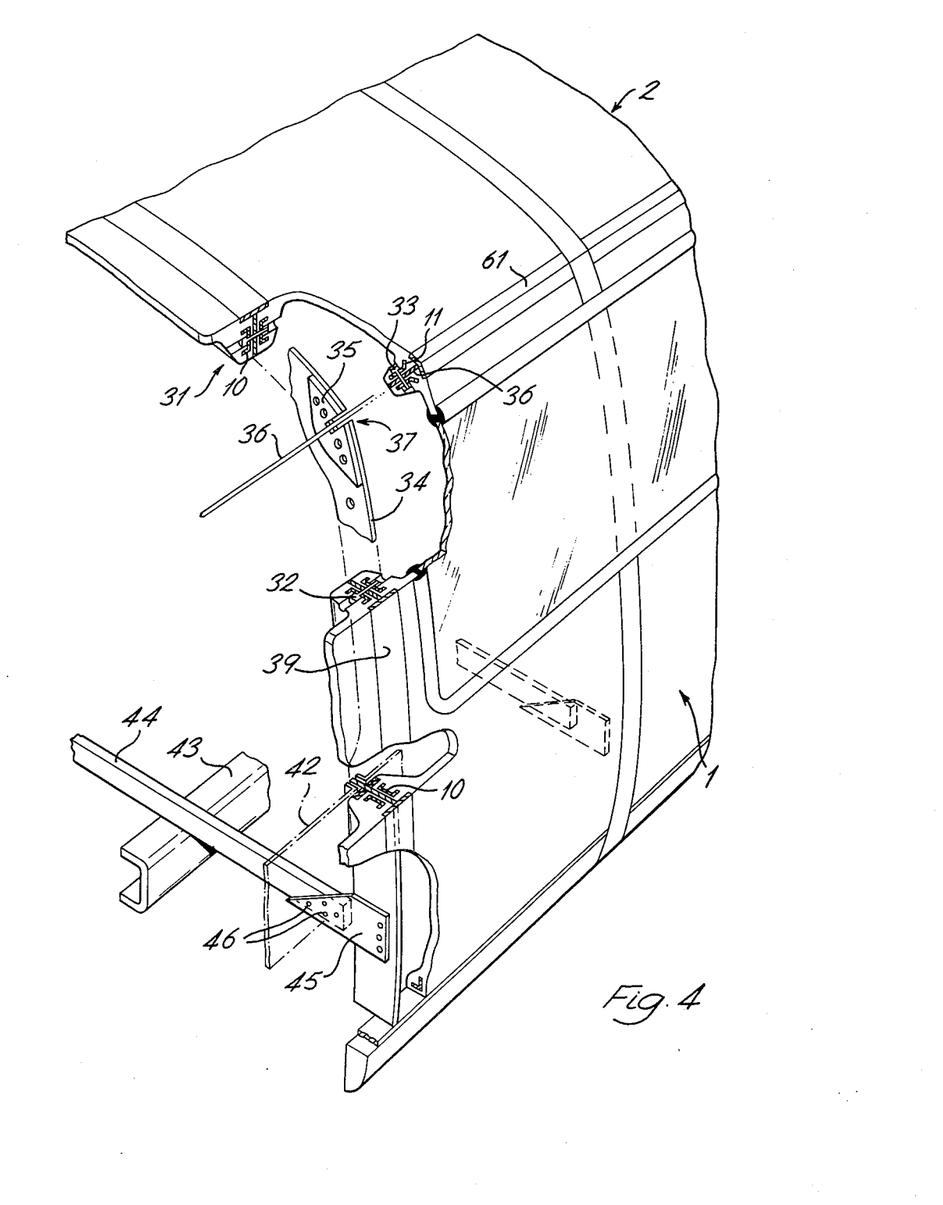
FIG. 4 is a broken perspective view through parts of an assembled vehicle.
Figure 5:
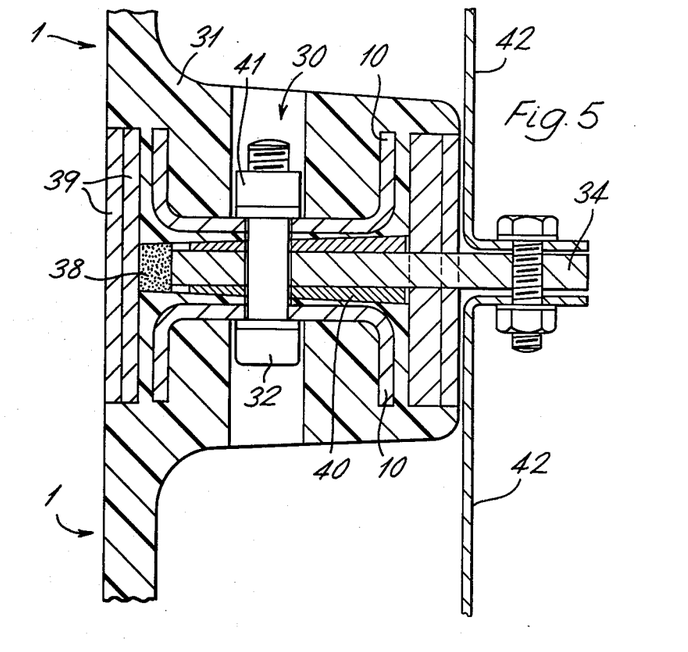
FIG. 5 is a section through the joint between two panels in adjacent arches.

FIG. 4 shows part of an assembled vehicle body, including assembled side panels 1 and roof panels 2 each containing reinforcement substantially as already described with reference to FIG. 2. In FIG. 4, however, the secondary reinforcement 13 has been omitted for clarity and the side members 10 are of channel-section, while the shorter side members 11 are still of angle section. Recesses 30 are formed in the deepened edge sections 31 of the moulded plastics of each panel to receive bolts 32 by which corresponding panels in adjacent arches 3 are fastened together, and bolts 33 by which the roof and side panels of the same arch are similarly fastened. To improve the rigidity and load bearing capacity of the finished body shell yet further, hoops including metal strips 34 joined by welded corner plates 35 are sandwiched in the joints between adjacent arches of panels, and long strips 36 running a substantial part of the length of the body are similarly sandwiched in the joints between corresponding pairs of panels down the length of the vehicle, corner plates 35 being notched as indicated by reference numeral 37 to make clearance for the strips. FIG. 5 shows a joint between two side panels 1, in adjacent arches 3, in section and in detail. The joint is sealed by mastic packing 38 and additional sealing and strengthening is provided by strips 39 which fit into suitable recesses in the inner and outer rims of the deep edges 31 of panels 1 and may be fastened by means of adhesive or mechanical fasteners (not shown). Tapered packings 40 may be used to ensure the correct alignment of the two panels before nut 41 is tightened upon bolt 32, and FIG. 5 shows clearly that recesses 30 are so deep that the nut and the head of the bolt both engage directly with the metal channel sections. For yet further rigidity, angle section strips 42 are bolted on to hoop members 34 from the inside face of the assembled panels. FIG. 4 shows a longitudinal member 43 and cross member 44 of the chassis, and shows how the side panels 1 are fastened to the cross members 44 by bolted connections between the lower ends of hoop members 34 and plates 45, which are in turn bolted at 46 to members 44.

Figure 6:
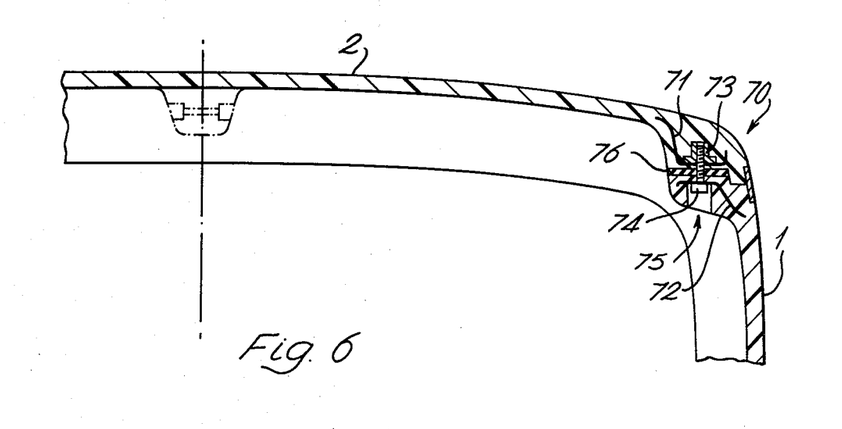
FIG. 6 is a section through another form of joint, between two panels in the same arch.

FIG. 6 shows an alternative to the method of joining roof panels 1 and side panels 2 shown in FIG. 4. Again both panels are formed with deepened edge sections 70, in which long reinforcement members 71, 72 are embedded during moulding. Threaded inserts 73 are attached to the members 71 prior to moulding, and are thus embedded in the roof panels 1 like the members 71 themselves. These inserts then act as the prelocated nuts for bolts 74 which are inserted from underneath through holes 75 formed in side panels 1. Better alignment and sealing between panels may result from this prefixing of parts of the connections, and the sealing may be further improved by interposing a resilient sealing strip 76 between the two edges 70. FIG. 6 also illustrates the possibility of the roof panel 1 being made in two halves joined along the roof centre line. Alternatively the roof assembly could include roof lights, separate panels being used for the roof light and outer areas.

Figure 7:
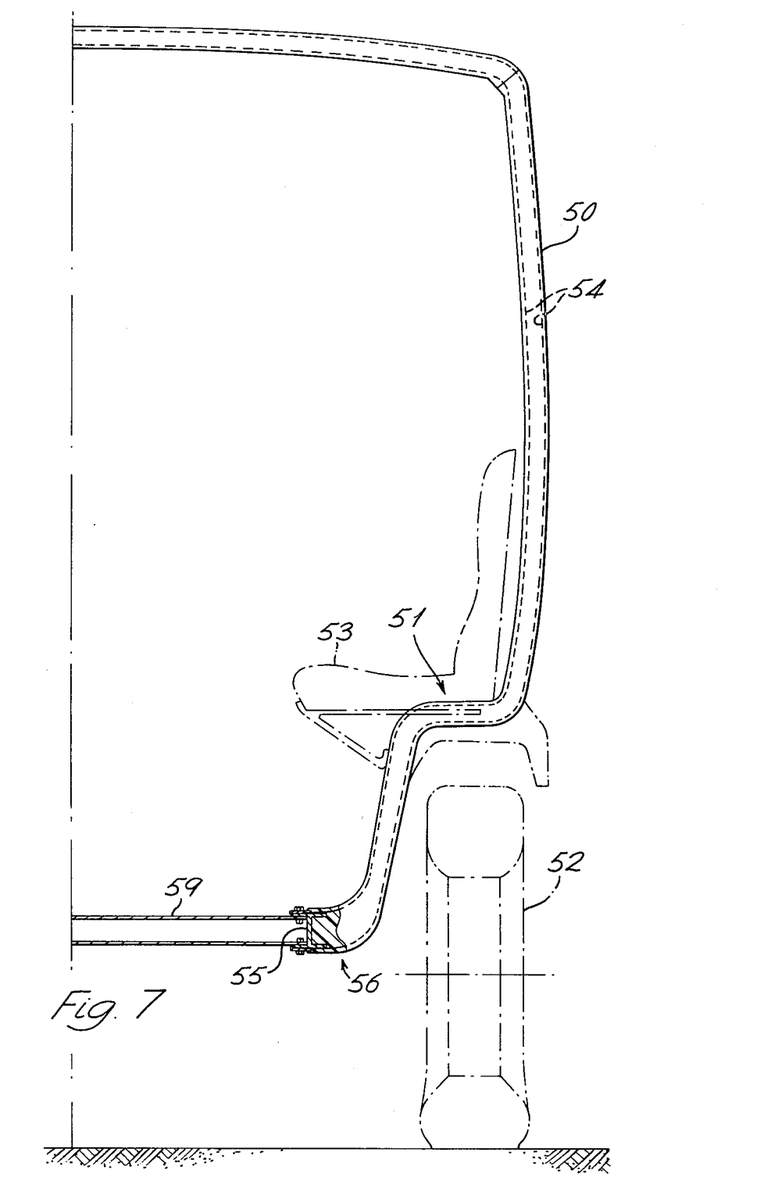
FIG. 7 is a diagrammatic section through part of another vehicle.
Figure 8:
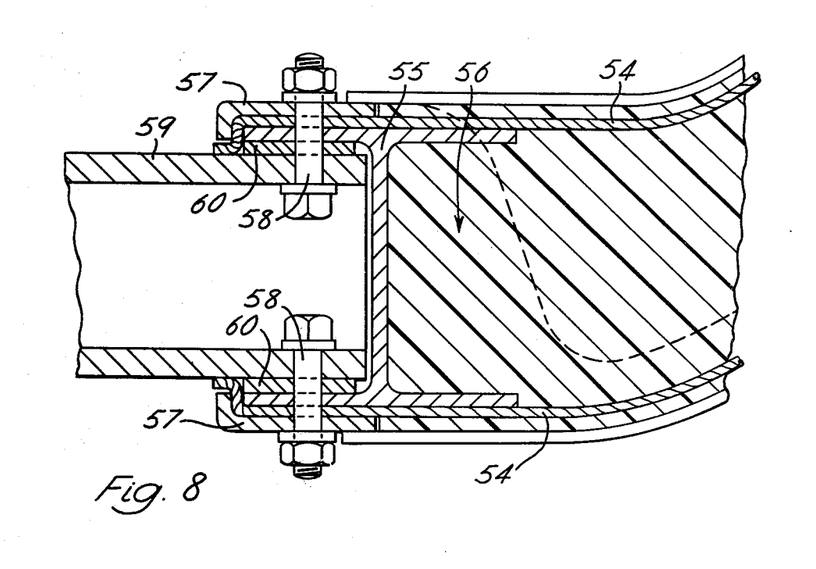
FIG. 8 is a detailed section through a joint between another type of panel and the chassis.

FIG. 7 shows part of a cross-section through a bus body made up of panels to yet another design according to this invention. Here the side panel 50 is shaped with a step 51, which may give clearance for the wheel 52 of the vehicle, thus making possible a reduction in the width of the vehicle. The step 51 may also provide a convenient mounting for a seat 53. In this panel also, as FIG. 8 shows most plainly, strong steel wire 54 takes the place of the rigid side frame members 10 of previous Figures. H-section strip reinforcement 55 is moulded into the enlarged section (56) of plastics at the lower rim of the panel, and the wires 54 are clamped to the lower edge reinforcement 55 by means of clamping pieces 57 and bolts 58, which also make the joint between the side panels 50 and the chassis cross member 59, a packing piece 60 being interposed therebetween.

Figure 9:
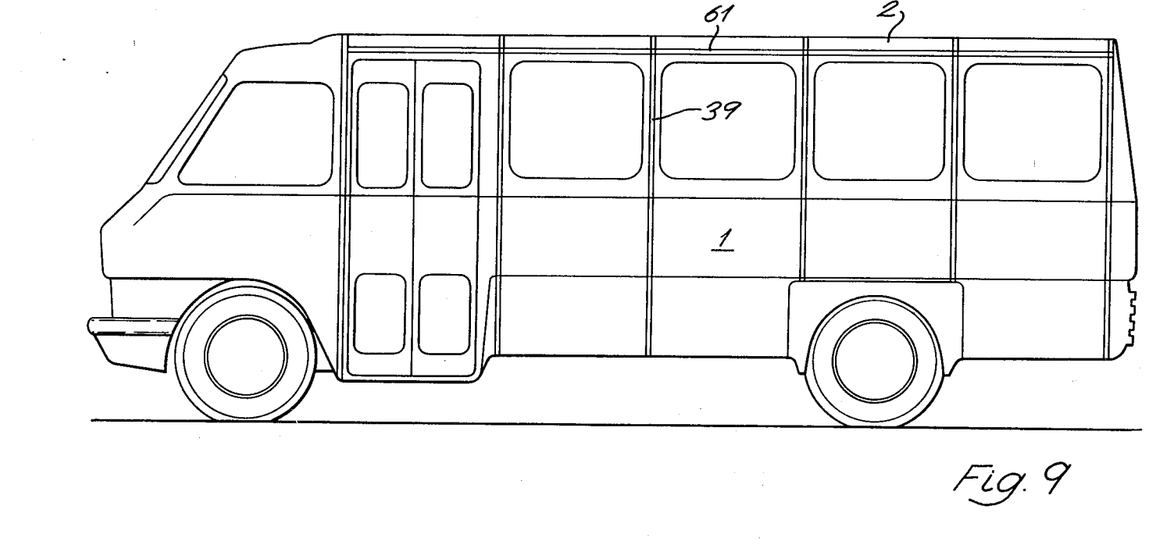
FIG. 9 is a diagrammatic side elevation of another bus, in which adjacent panels are jointed as shown in FIG. 5.

FIG. 9 shows another bus of the general kind already described with reference to FIGS. 4 and 5, showing in particular the cover strips 39 and a corresponding longitudinal cover strip 61. It also shows that one of the side panels 1 in the foremost "arch" 3 has been omitted and doors substituted. These doors could also be of panel construction according to the present invention.

One part of a vehicle body, as distinct from a whole body, to which the invention may be applied with particular advantage is a lorry cab. Here there may be just a single arch, or only two or three arches of panels, spanning from one side of the vehicle to the other, joined to end panel sections making up the cab front (including the windscreen) and the rear of the cab. The bottoms of the arch panels and of the end panel sections may be anchored direct to the chassis as in constructions previously described. Alternatively, they may be anchored to some frame that gives the necessary independent rigidity to the assembled panel sections and which will itself, in use, be connected to the chassis. This form of construction, in which the assembled sections are indirectly connected to the chassis in use instead of directly, is of general application to this invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A body panel for a vehicle, a lightweight construction containing reinforcement members which contribute to said panel sufficient strength for said reinforcement members to serve as part of both a transverse and longitudinal load-bearing frame structure of said vehicle, comprising:
   a panel formed from plastics by moulding wherein;
   said reinforcement members include both longitudinally-arranged and transversely-arranged primary reinforcing members moulded within said panel; and
   said primary reinforcing members include attachment means such that said panel may be joined to transversely adjacent panels so that said transversely-arranged primary reinforcing members unite with similar reinforcing members in said adjacent panel to form part of said transverse load-bearing frame structure of said vehicle, and such that said panel may be joined to longitudinally-adjacent panels so that said longitudinally-arranged primary reinforcing members unite with similar reinforcing members in said adjacent panel to form part of said longitudinal load-bearing frame structure of said vehicle.

2. A body panel for a vehicle, according to claim 1, in which said plastics material is of self-skinning type.

3. A body panel for a vehicle, according to claim 1, having edge regions of deeper section than remaining portions of said panels, said primary reinforcing members being located in said edge regions.

4. A body panel for a vehicle, according to claim 3, in which said primary reinforcing members include flexible members strong in tension, for instance members of metal wire.

5. A body panel for a vehicle, according to claim 3, in which said reinforcing members include strong rigid members, for instance metal rod members of channel-section or angle-section.

6. A body panel for a vehicle, according to claim 1, in which said attachment means whereby said panel may be joined to adjacent panels or other parts of said vehicle comprise holes for rivets, bolts or the like formed in said primary reinforcing members mounted in edge regions of said body panel.

7. A body panel for a vehicle, according to claim 1, in which said reinforcement members include secondary reinforcing members, and in which said secondary reinforcing members are included within said panel during moulding.

8. A body panel for a vehicle, according to claim 7, in which said secondary reinforcing members are of sheet-like form, and are present over a substantial proportion of the area of said body panel.

9. A body panel for a vehicle, according to claim 1, shaped so as to provide some facility in addition to service as part of any load-bearing structure of said vehicle.

10. A vehicle body structure for association in use with a vehicle chassis comprising:
   a body shell including a plurality of interconnected, reinforced, moulded body panels containing reinforcing members;
   wherein said body panels are arranged in a lengthwise succession of arch-like structure down the length of said vehicle;
   each of said arch-like structures span from one side of said vehicle to the other side;
   each of said body panels is joined rigidly in circumferential fashion to an adjacentsaid panel in said arch-like structure, so that the reinforcing members are also joined to form transverse hoop-like load-bearing members, each of said body panels is rigidly joined in lengthwise fashion to a corresponding panel in the adjacent arch-like structures;

each of said reinforcing members include both longitudinally-arranged and transversely-arranged primary reinforcing members; and attachment means connected to said primary reinforcing members such that said panel may be joined to transversely-adjacent panels so that said transversely-arranged primary reinforcing members unite with similar reinforcing members in said adjacent panel to form part of said transverse load-bearing frame structure of said vehicle and such that said panel may be joined to longitudinally-adjacent panels so that said longitudinally-arranged primary reinforcing members unite with similar reinforcing members in said adjacent panel to form part of said longitudinally load-bearing frame structure of said vehicle.

11. A vehicle body structure according to claim 10 in which at least some of said body panels include customary vehicle features such as windows and doors.

12. A vehicle body structure according to claim 10 in which said body shell of said vehicle is completed by further panels, for instance for the front and rear ends of said vehicle.

13. A vehicle body structure according to claim 10 in which further arch-like structural members—for instance metal rings—are included between adjacent panels of said arch-like structures.

14. A vehicle body structure according to claim 10 in which longitudinal structural support members—for instance, metal rod or strips—are included between corresponding pairs of said body panels of said adjacent arch-like structures along the length of said vehicle body.

* * * * *